May 15, 1923.  1,455,743
D. B. D. BLAKE
SHOCK ABSORBER
Filed Feb. 9, 1921  2 Sheets-Sheet 1
Fig. 1.
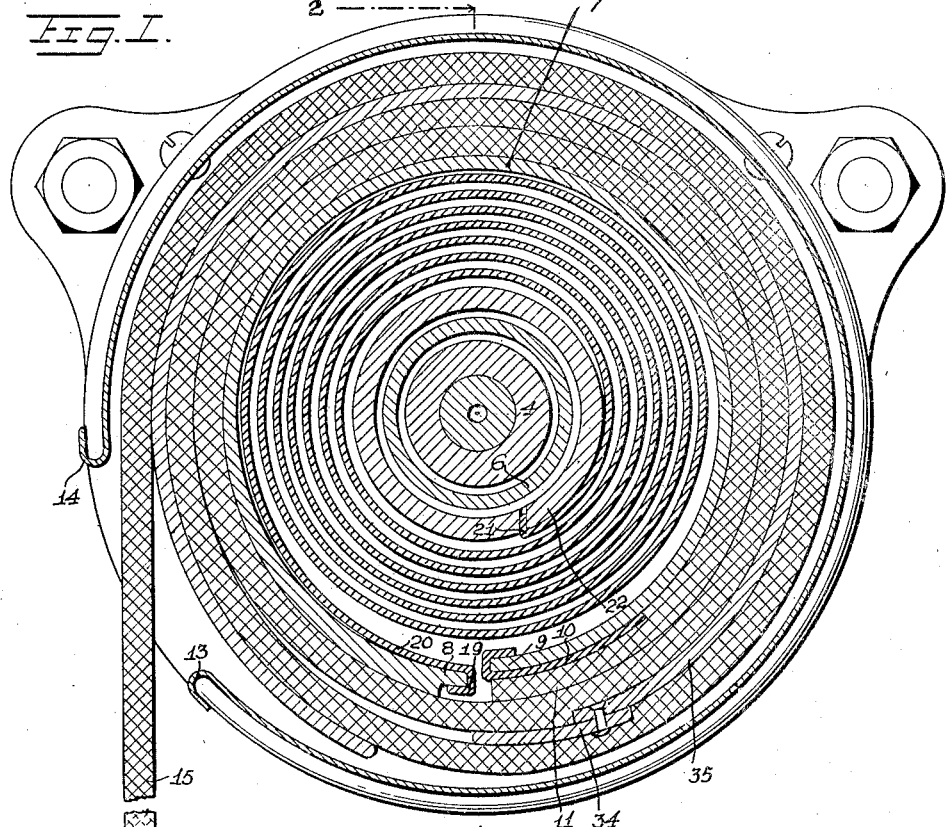
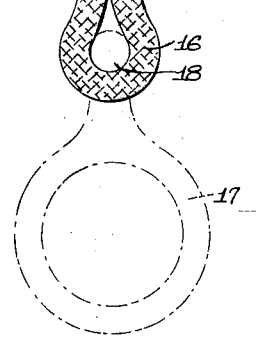
Fig. 5.
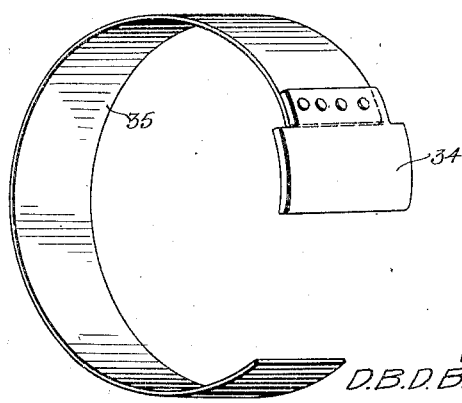
WITNESSES
H. J. Walker
Robert J. Hulsizer
INVENTOR
D. B. D. BLAKE
BY Munn & Co
ATTORNEYS May 15, 1923. 1,455,743
D. B. D. BLAKE
SHOCK ABSORBER
Filed Feb. 9, 1921      2 Sheets-Sheet 2
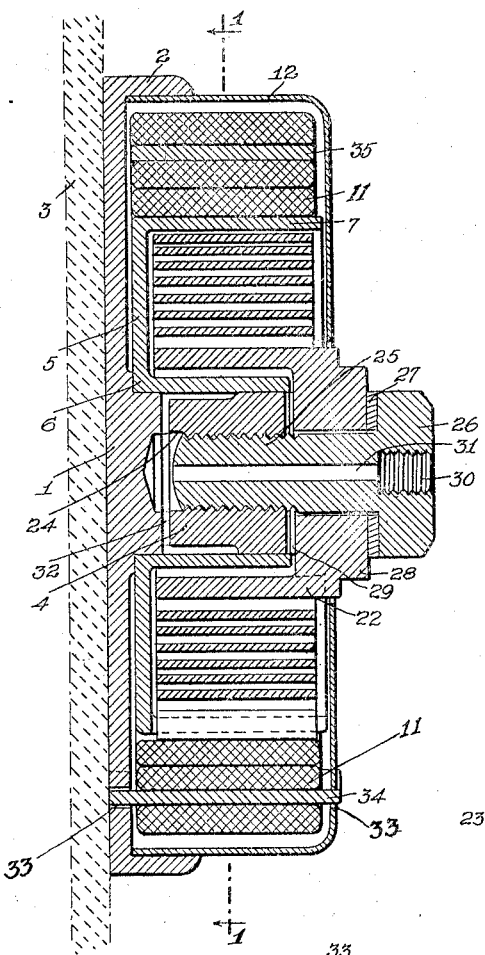
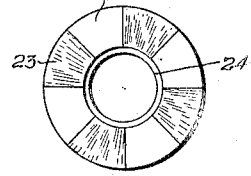
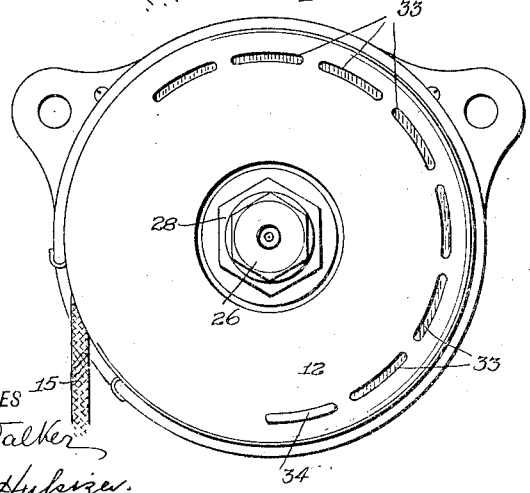
WITNESSES
H. T. Walker
Robert I. Hulsizer
INVENTOR
D.B.D.BLAKE
BY
ATTORNEYS Patented May 15, 1923.

1,455,743

UNITED STATES PATENT OFFICE.

DENNIS B. D. BLAKE, OF QUINCY, ILLINOIS.

SHOCK ABSORBER.

Application filed February 9, 1921. Serial No. 443,606.

*To all whom it may concern:*

Be it known that I, DENNIS B. D. BLAKE, a citizen of the United States, and a resident of Quincy, in the county of Adams and State of Illinois, have invented a new and Improved Shock Absorber, of which the following is a full, clear, and exact description.

This invention relates to shock absorbers, and has particular reference to a new and improved shock absorber applicable to automobiles.

An object of the invention is the provision of a shock absorber employing a flexible band connecting a portion of the chassis with the body of an automobile, and comprises the provision of means whereby the flexible band is always kept under a minimum tension to prevent the formation of slack portions.

Another object is the provision of means in the shock absorber whereby the rebound of the body of the car from the chassis is substantially soft or reduced by friction-braking means within the absorber acting on the band.

A further object of the invention resides in the provision of adjustable mechanism whereby the degree of application of the friction brake can be regulated as desired.

A still further object of the invention resides in the particular construction and arrangement of parts hereinafter described and claimed and shown in the accompanying drawings.

The invention in general comprises a flexible band extending from the chassis to the body of an automobile, and this band, as disposed in connection with the body, is wound in a coil on a suitable support. To this support a resilient member, such as a spring, is connected which tends always to keep the slack out of the flexible band. This band is disposed within a suitable casing, which may be attached to the body of the automobile. A friction-brake member is disposed within the casing through and between a portion of the length of the layers of the flexible material, and this braking or friction tongue is connected at one end rigidly to the casing; the remaining portion lying along and between adjacent layers of the flexible band creates friction therebetween when the band moves relative to the braking member. This tongue provides friction-retarding means disposed throughout the length and between adjacent layers of the band, tending to direct the movement of the band and, consequently the movement of the body of the car in the desired direction and which is preferably in a direction away from the chassis on the rebound.

The invention is shown in the drawings, of which—

Figure 1 is a sectional view taken on the line 1—1 of Figure 2;

Figure 2 is a sectional view taken on the line 2—2 of Figure 1;

Figure 3 is a front view of the shock absorber;

Figure 4 is a detail of one of the adjustable clutch jaws within the device; and Figure 5 is a perspective enlarged detail of the friction tongue or braking member.

The preferred embodiment of my invention as illustrated in the drawings comprises a circular baseplate 1 having an upturned annular flange 2 thereon which may be applied to the body portion, such as 3, of an automobile, or other part, the movement of which with respect to another element is to be regulated and controlled. In the center of this baseplate 1 is a spindle 4 projecting outwardly at right angles thereto. Disposed around this spindle or stub shaft 4 there is a drum 5. This drum 5 is provided with an outwardly extending flange portion 6 and a similarly extending flange portion 7. These flange portions are spaced apart and form therebetween a groove in the shape of an annulus. This drum is loosely mounted on the spindle 4 and can rotate therearound.

As shown particularly in Figure 1, the flange portion 7 is split and formed with adjacent end portions 8 and 9. To the end portion 9 a metallic link 10 is connected. To this link 10, in any suitable manner, the end 11 of a band of flexible belting of any suitable length and material is connected. This belting is preferably of woven cotton, which may be impregnated with oil and graphite to prevent squeaking. This belt or band 11 is wrapped around the drum 5 in a counterclockwise direction.

A cover 12 of any suitable material, such as sheet metal, is disposed over the mechanism and may be connected at its inner end with the flange portion 2. This cover is broken away and has rounded corners, such as 13 and 14, spaced apart and providing an opening through which the end 15 of the flexible band extends. This end 15 is formed in the shape of a loop 16 to which a portion 18 of an axle clip or shackle 17 is connected.

To the other adjacent end portion 8 of the flange 7 on the drum 5, the end 19 of a flat coiled spring 20 is connected. The other end 21 of this spring is suitably fastened to the outer surface of a tension nut 22. The spindle 4 is provided on its outer face with clutch jaws, such as 23, of any suitable type and with a threaded bore 24 into which the similarly threaded nut 25 of a bolt 26 is adapted to extend. Between the head of the bolt 26 and the outer face 28 of the tension nut 22 a washer 27 is disposed. The tension nut 22 is hollow interiorly and surrounds the end of the spindle 4 and the flange 6 on the drum 5. The inner face thereof, adjacent the end of the spindle 4, is provided at 29 with clutch jaws or faces similar to the jaws 23 above mentioned. These co-operating clutch jaws enable the tension nut 22 to be fixedly positioned with respect to the spindle 4, whereby the tension of the spring 20 can be adjusted. The nut 22 can be held in any desired position by tightening up the bolt or cap screw 26. It is obvious that when the casing is attached to the frame of an automobile and the end of the belt is attached to an axle, any vertical movement of the axle or frame will cause a rotating movement of the drum 5 and a corresponding peripheral movement of the coils of the belting 11. As the chassis and the body of the car separate, the belting or band 11 is pulled out, and in so doing the spring 20 is wound up. This elongation of the belt takes place against the action of the spring 20 and, therefore, when the force tending to elongate the band is released, the spring immediately exerts its compressive force against the belt to hold it taut and prevent the formation therein of any slack.

The outer face of the cap screw or bolt 26 is provided with a threaded bore 30 into which a grease cup may be introduced. This bore is connected by a passage 31 with lubricating passages 32 connecting with the inner surface of the drum 5 whereby the movement of the drum 5 on the spindle 4 is continued with the minimum amount of friction.

With particular reference to Figure 3, it will be noted that the cover portion 12, and it is understood that the baseplate 1 as well, is provided with a series of slotted holes such as 33 which are arranged on a radius a little larger than the inside radius of the outer coil of belting. The holes in the cover 12 and the baseplate 1 are similar and disposed correspondingly. In corresponding pairs of the holes in the cover and the baseplate anchor lugs 34 of a friction tongue 35 are disposed. The main body of the friction tongue or brake member 35 is disposed between the coils of the flexible belting or band 11, and by reason of the fact that the end 34 of the tongue is rigidly connected and engaged with the casing in the cover, any relative sliding movement of the belting with respect to the tongue results in friction therebetween which tends to retard the movement of the belting. This tongue is in the form of a strip of bronze or other suitable material of the proper dimensions between suitable coils. As shown in Figure 1, the stationary end of this tongue is connected to the cover and the body portion extends therefrom in a counterclockwise direction, similar to the direction of movement of the flexible band when the body of the car tends to separate from the chassis. Since this direction of movement takes place when the car is on the rebound, it will be noticed, therefore, that the greatest braking action, due to the combined resisting action of the spring 11 and the friction tongue 35, will take place on the rebound, which is the desired condition. When the car reaches the top of the rebound the belt will slacken and the pressure on the friction tongue will be released. At this instant a tendency for slack to be produced in the belt exists, but this tendency is removed by the action of the spring 11 which removes all slack and keeps the belt taut and rewinds the same as the car assumes its normal position with respect to the chassis.

It will be noted that in the position shown in Figure 1 the surface of the friction tongue or braking strip is adjusted in such a pair of locking holes as permit a certain portion of this surface to be in contact normally with the belting or band 11. However, it can be readily seen that by adjusting the head of the braking strip in another pair of holes, a greater or less amount of the surface thereof can be normally placed in contact with the belt whereby the friction therebetween can be varied at will. The anchor lug or head 34 of the friction tongue or strip 35 may be made of any suitable material and is preferably a bronze casting.

It will, therefore, be observed that I have provided a simple, compact apparatus for absorbing shocks on automobile bodies wherein a flexible band is used and means are provided for maintaining this band under a certain minimum tension at all times to keep it taut. A simple and readily adjustable means is provided for creating a maximum retarding force when the belt is being unwound on the rebound of the car. By providing an adjustable friction means the degree of application of the friction can be varied as desired. By providing a spring, as above mentioned, the belt when released from the action of the brake member or friction device is instantly placed under a definite tension by the spring and rewound on the drum as the car returns to normal position. It will, of course, be understood that minor modifications may be made in this device without departing from the spirit of the invention.

What I desire to claim is:

1. A shock absorber comprising a casing adapted to be applied to the body of an automobile, a coiled band within said casing, one end of said band adapted to be attached to the chassis of the automobile, resilient means within the casing and connected to said band to apply constant tension thereto as the body and the chassis move relative to each other, and a metallic friction strip disposed between and along adjacent convolutions of said band, said strip fastened at one end rigidly to said casing, the other end of said strip being free whereby friction is produced between the strip and the convolutions of the band when the band moves in one direction with respect to the casing.

2. A shock absorber comprising a casing adapted to be applied to the body of an automobile, a coiled band within said casing, one end of said band adapted to be attached to the chassis of the automobile, resilient means within the casing and connected to said band to apply constant tension thereto as the body and the chassis move relative to each other, a cover for said casing, said casing and said cover each having a series of spaced slots disposed therein in a line corresponding to the circumference of a circle of a definite diameter, a metallic friction strip disposed within the casing between and along adjacent convolutions of said band which lie on the circumference and the radius of which approximates the radius of the above-mentioned series of holes, and a head on the end of said strip having outwardly projecting lugs which are adapted to project into any desired pair of holes of said series, whereby the one end of the strip can be adjustably fastened to the cover and casing, leaving the other end of the strip free to produce the desired amount of friction between the strip and the belting when the belting moves in one direction with respect to the casing.

3. A shock absorber comprising a casing, a coiled friction belting disposed therein, a friction strip disposed between and along adjacent convolutions of said belting, a certain portion of the length of said strip adapted normally to contact with the convolutions of the belting, means for fastening one end of said strip to said casing, the other end of said strip being free and lying along between adjacent convolutions of the belting and means for adjusting the position of the engagement of the fixed end of said strip with said casing whereby the area of contact of the strip with the convolutions of the belting can be varied to vary the friction therebetween when the belting moves in a given direction.

DENNIS B. D. BLAKE.